US009209967B2

United States Patent
Yup

(10) Patent No.: US 9,209,967 B2
(45) Date of Patent: Dec. 8, 2015

(54) PRECALCULATED ENCRYPTION KEY

(75) Inventor: Nhu-Ha Yup, Phoenix, AZ (US)

(73) Assignee: Exelis, Inc., McLean, VA (US)

( * ) Notice: Subject to any disclaimer, the term of this patent is extended or adjusted under 35 U.S.C. 154(b) by 1579 days.

(21) Appl. No.: 11/716,916

(22) Filed: Mar. 12, 2007

(65) Prior Publication Data

US 2010/0027783 A1  Feb. 4, 2010

(51) Int. Cl.
H04L 9/06 (2006.01)

(52) U.S. Cl.
CPC ........... *H04L 9/0643* (2013.01); *H04L 9/0631* (2013.01); *H04L 2209/125* (2013.01); *H04L 2209/24* (2013.01)

(58) Field of Classification Search
CPC . H04L 9/0631; H04L 9/0643; H04L 2209/24; H04L 2209/125
USPC .............................................. 713/176; 380/44
See application file for complete search history.

(56) References Cited

U.S. PATENT DOCUMENTS

| | | | |
|---|---|---|---|
| 6,937,727 B2 | 8/2005 | Yup et al. | |
| 2003/0223580 A1 | 12/2003 | Snell | |
| 2006/0002549 A1 | 1/2006 | Avasarala | |
| 2006/0034456 A1* | 2/2006 | McGough | 380/30 |
| 2006/0126835 A1 | 6/2006 | Kim et al. | |
| 2007/0081668 A1* | 4/2007 | McGrew et al. | 380/37 |
| 2008/0130889 A1* | 6/2008 | Qi et al. | 380/257 |

FOREIGN PATENT DOCUMENTS

WO   WO 2004/002057   12/2003

OTHER PUBLICATIONS

Niels Ferguson, "Authentication Weaknesses in GCM", May 20, 2005, Microsoft, pp. 1-10.*

David A. McGrew et al., "The Galois/Counter Mode of Operation (GCM)", pp. 1-41.
Advanced Encryption Standard (AES), Federal Information Processing Standards Publication 197, Nov. 26, 2001, pp. 1-47.
McGrew, D. et al., "The Galois/Counter Mode of Operation (GCM)," available from http:csrc.nist.gov/groups/ST/toolkit/BCM/documents/proposedmodes/gcm/gcm-revised-spec.pdf, May 31, 2005.
Search Report mailed Jun. 18, 2006 in UK Patent Appln. No. 0804483.6.
AU Appln. No. 2008201156—Feb. 7, 2011 APO Examination Report.
UK Appln. No. 0804483.6—Feb. 22, 2011 UK IPO Examination Report.
ES Appln. No. 200800722—Mar. 7, 2011 Spanish Patent Office (OEPM) Publication of the Technical Status and Written Opinion.
UK Appln. No. 0804483.6—Sep. 26, 2011 UK IPO Examination Report.
DE Appln. No. 102008013785.5—Dec. 27, 2011 German Patent and Trademark Office Office Action.
DE Appln. No. 102008013785.5—May 24, 2012 German Patent and Trademark Office Action.

* cited by examiner

*Primary Examiner* — Harunur Rashid
(74) *Attorney, Agent, or Firm* — Davidson, Berquist, Jackson & Gowdey, LLP

(57) ABSTRACT

An authenticated encryption method includes receiving, by an Advanced Encryption Standard (AES) engine, a cipher key and computing a hash key using the received cipher key. The computed hash key is stored in a storage memory. The AES engine then receives a packet of data and encrypts the packet of data using the received cipher key. The hash key from the storage memory is sent to a GHASH engine which is used to authenticate the packet of data. Encrypting the packet of data is performed after the hash key is stored in the storage memory. Input flow of the packet of data is enabled after the hash key is stored in the storage memory.

20 Claims, 8 Drawing Sheets

PRECALCULATED ENCRYPTION KEY

FIELD OF THE INVENTION

The present invention relates, in general, to a system and method for providing authenticated encryption and decryption. More specifically, the present invention relates to a method for calculating an encryption key in a system having multiple channels of advanced encryption standard (AES) block cipher algorithms.

BACKGROUND OF THE INVENTION

When two parties communicate, they often need to protect both the privacy and the authenticity of the transmitted data. Protecting the privacy of the data ensures that unauthorized parties will not understand the content of transmissions. Protecting the authenticity of the data provides assurance to the receiving party that the actual sender of a message coincides with the claimed sender of the message. It thereby provides assurance to the receiver that the message was not accidentally or intentionally modified in transit.

In an authenticated-encryption method, the sender encrypts a message using a key and a nonce (also called an initialization vector, or IV) to yield a ciphertext. The receiver decrypts the ciphertext using a key and a nonce to yield either a message or a special symbol for invalid that indicates to the receiver that the ciphertext should be regarded as inauthentic.

Privacy-only encryption computes a ciphertext from a plaintext, a key, and a nonce. A message authentication code (MAC) computes an authentication tag from a message and a key. To MAC a message means to compute its authentication tag using a message authentication code.

By way of further background, the advanced encryption standard (AES) block cipher algorithm, or AES cipher, is an iterative cipher algorithm, meaning the data is similarly manipulated a predetermined number of rounds. The block length is fixed to 128 bits and the key length may be independently set to 128, 192 or 256 bits. The AES cipher also allows for a variable number of rounds (Nr), the total of which may be 10, 12 or 14, and which depend on the block length and key length.

The AES cipher encrypts a block of data by performing 9, 11 or 13 complete round transformations followed by a final incomplete round transformation. The incomplete round transformation includes one less step than a complete round transformation. The data string that is operated upon during each round is called a "State," which may be represented as a rectangular array of bytes having four rows and a number of columns (Nb) that varies with the block length. Specifically, the value of Nb is equal to the block length (i.e., 128, 192 or 256) divided by 32, meaning it has a value of either 4, 6 or 8. Each of the complete rounds includes the following four transformations, performed in the following order: (1) ByteSub; (2) ShiftRow; (3) MixColumn; and (4) AddRoundKey. The incomplete round transformation does not include the MixColumn transformation.

Similar to encryption, the AES cipher decrypts data by performing the same number of complete rounds followed by an incomplete round. Because the encryption transformations are invertible, the State of each decryption round is operated on by the inverse of the above-noted transformations. Moreover, the properties of the transformations and inverse transformations allow for symmetry in the encryption and decryption algorithms. In other words, each complete decryption round includes the following inverse transformations, which may be performed in the listed order (1) InvByteSub; (2) InvShiftRow; (3) InvMixColumn; and (4) InvAddRoundKey. Again, similar to encryption, the incomplete decryption round transformation does not include the InvMixColumn transformation.

Greater detail of the AES cipher may be found in a Federal Information Processing Standards Publication (FIPS-PUBS) issued by the National Institute of Standards and Technology (NIST). The publication is the Advanced Encryption Standard (AES), dated Nov. 26, 2001, and may be obtained electronically at http://csrc.nist.gov/publications/. This publication is incorporated herein, in its entirety, by reference.

The AES cipher supports different operation modes, including cipher block chaining (CBC), electronic codebook (ECB) and Galois counter mode (GCM). The GCM is a block cipher mode of operation that uses hashing over a binary Galois field to provide authenticated encryption. The detailed document titled "The Galois/Counter Mode of Operation (GCM)" may be found at csrc.nist.gov/CryptoToolkit/modes/proposedmodes/gcm/gcm-spec.pdf. This publication is also incorporated herein, by reference, in its entirety.

A conventional GCM-AES block cipher system includes encryption performed during 10, 12 or 14 rounds using round keys. A hash key is calculated from the round keys to provide authenticated encryption for every frame or packet that is transmitted to a remote receiver. This requires 10, 12 or 14 clock cycles for every frame or packet that is transmitted by the sender. Similarly, during decryption, the receiver requires 10, 12 or 14 clock cycles to calculate the hash key from the round keys for every frame or packet. This disadvantageously results in increased throughput and delay by the processor in authenticating the respective frame or packet. The present invention addresses and, as one of its features, solves this deficiency.

SUMMARY OF THE INVENTION

To meet this and other needs, and in view of its purposes, the present invention provides an authenticated encryption method. The method includes the steps of: (a) receiving, by an Advanced Encryption Standard (AES) engine, a cipher is key; (b) computing, by the AES engine, a hash key using the received cipher key; (c) storing the computed hash key in a storage memory; (d) receiving, by the AES engine, a packet of data; (e) encrypting, by the AES engine, the packet of data using the received cipher key; (f) receiving the hash key, by a GHASH engine, from the storage memory; and (g) authenticating the packet of data, by the GHASH engine, using the hash key. The encrypting step includes using a counter mode in the AES engine to encrypt the packet of data. Using the counter mode includes iteratively XOR-ing (a) a plaintext portion of the packet of data with (b) an encrypted value of counter data using the cipher key, and thereby obtaining a ciphertext of data. The authenticating step includes transmitting the ciphertext to the GHASH engine, and iteratively multiplying the ciphertext, by the GHASH engine, using the hash key. Encrypting the packet of data is performed after the hash key is stored in the storage memory.

After the hash key is stored in the storage memory, the input flow of the packet of data is enabled. The packet of data is encrypted using the encryption key and, after enabling the input flow of the packet of data, the packet of data is authenticated using the hash key stored in the storage memory.

The hash key is computed by performing 10 rounds of key expansions on the received cipher key, if the received cipher key is a 128 bit block of data; and by performing 12 rounds of key expansions on the received cipher key, if the received cipher key is a 192 bit block of data; and by performing 14 rounds of key expansions on the received cipher key, if the received cipher key is a 256 bit block of data.

The method of the invention includes receiving at least two separate cipher keys from respective data channels, and computing at least two separate hash keys corresponding to the at least two separately received cipher keys. Receiving the packet of data includes receiving during an interval of time a predetermined number of packets of data. Calculating the hash key includes calculating the hash key once per the interval of time, and storing the computed hash key includes storing the computed hash key once per the interval of time.

Another embodiment of the invention includes an authenticated encryption module. The encryption module includes an AES engine for using a cipher key to compute a hash key, a storage memory for storing the computed hash key, and a GHASH engine for receiving the computed hash key stored in the storage memory for authenticating a packet of data. The AES engine encrypts the packet of data to form ciphertext. The GHASH engine receives the ciphertext from the AES engine to multiply the received ciphertext with the computed hash key. An authentication tag is computed using the multiplied ciphertext with the computed hash key. A controller enables input flow of the packet of data, after the computed hash key is stored in the storage memory. The packet of data includes additional authenticated data (AAD), and the GHASH engine is configured to receive the AAD to multiply the AAD with the computed hash key.

The AES engine is configured to receive at least two different encryption keys from respective data channels. The AES engine includes two encryption modules for encrypting at least two different packets of data received from the respective data channels using the at least two different encryption keys. The packet of data includes multiple packets of data, and the hash key is computed by the AES engine once for all the received multiple packets of data. The hash key is stored in the storage memory once for all the received multiple packets of data.

It is understood that the foregoing general description and the following detailed description are exemplary, but are not restrictive, of the invention.

BRIEF DESCRIPTION OF THE DRAWINGS

The invention is best understood from the following detailed description when read in connection with the accompanying drawings.

DETAILED DESCRIPTION OF THE INVENTION

The present invention includes an AES-GCM mode of operation. The GCM has two operations, authenticated encryption and authenticated decryption. The authenticated encryption operation has four inputs, each of which is a bit string, as follows:

(1) a secret key K, whose length is appropriate for the underlying block cipher;
(2) an initialization vector IV (nonce);
(3) a plaintext P; and
(4) additional authenticated data (AAD), which is denoted as A. This data is authenticated, but not encrypted.

The authenticated encryption operation has two outputs as follows:

(1) a ciphertext C, whose length is exactly that of the plaintext P; and
(2) an authentication tag T. The length of the tag is denoted as t.

If the block cipher width is The authenticated decryption operation, and len( ) is the number of bits in an argument, then $$0 \leq \text{len}(P) \leq (2^{32}-2)w,$$

$$0 \leq \text{len}(A) \leq 2^{w/2},$$

$$0 \leq \text{len}(IV) \leq 2^{w/2},$$

$$\text{len}(C) = \text{len}(P), \text{ and}$$

$$\text{len}(T) = t \leq w.$$

Figure 1:
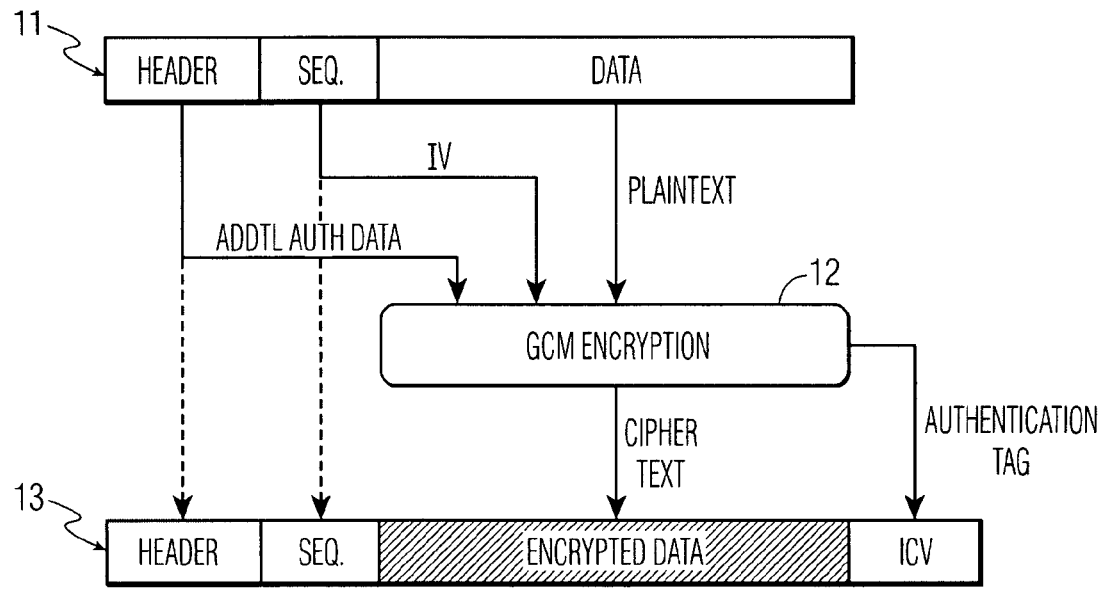
FIG. 1 is a functional block diagram showing an exemplary encryption and authentication of a packet (or frame) of data.

An exemplary encryption and authentication of a packet (or frame) of data is shown in FIG. 1. As shown, input packet 11 includes a header field, a sequence field, and a plain data field. The data field is encrypted and authenticated by GCM encryption module 12. The header field may be authenticated in the GCM encryption module by including it in the AAD field. The sequence field may be included in the IV and sent to the GCM encryption module. The GCM encryption module thus encrypts and authenticates packet 11. The output packet, shown as packet 13, is transmitted to the receiver and includes (1) the encrypted data field, (2) the authentication tag which is carried in the integrity check value (ICV) field, and the appended (3) header field and (4) sequence field.

By including the sequence number in the IV, the requirement that the IV values be unique may be satisfied. The data that forms the IV has to be known by both the encryption side and the decryption side, but the IV needs not to be included in the packet and may be sent separately. It will be appreciated that the length of the plaintext of input packet 11 is the same as the length of the ciphertext of output packet 13.

Figure 2:
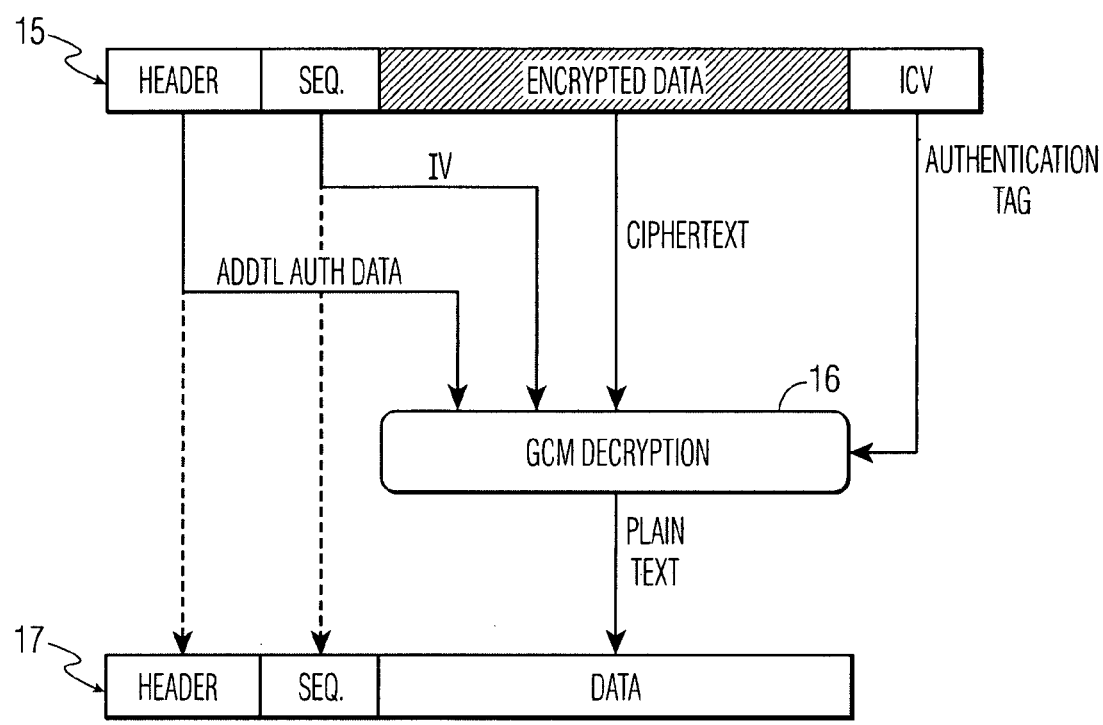
FIG. 2 is a functional block diagram showing an exemplary decryption and authentication of an encrypted packet (or frame) of data.

Referring next to FIG. 2, there is shown GCM decryption module 16 which decrypts and verifies the authenticity of the received input packet 15. The GCM encryption module decrypts the ciphertext to provide the plaintext of output packet 17. The authentication tag is compared to an internally calculated authentication tag to verify the authenticity of input packet 15. The final output packet includes the header field and the sequence field, as shown.

The authenticated decryption operation has five inputs: K, IV, C, A, and T. The authenticated decryption operation has only a single output, either the plaintext value P or a special symbol FAIL that indicates that the input data is not authentic. The ciphertext C, the initialization vector IV, the additional authenticated data A and the tag T are authentic for key K, when they are generated by the encryption operation of GCM encryption module 12 with inputs K, IV, A and plaintext P. The authenticated decryption operation of GCM decryption module 16, with high probability, returns FAIL whenever its inputs were not created by the encryption operation with the identical key.

The additional authenticated data A is used to protect information that needs to be authenticated, but which must be left unencrypted. When using GCM to secure a network protocol, the A data may include addresses, ports, sequence numbers, protocol version numbers, and other fields that indicate how the plaintext should be handled, forwarded, or processed. In many situations, it may be desirable to authenticate these fields, though they must be left in the clear to allow the network or system to function properly. When this data is included in the AAD, authentication is provided without copying the data into the ciphertext.

The primary purpose of the IV is to be a nonce, that is, to be distinct for each invocation of the encryption operation for a fixed key. It is acceptable for the IV to be generated randomly, so long as the distinctness of the IV values is highly likely. The IV is authenticated, and it is not necessary to include it in the AAD field.

The strength of the authentication of P, IV and A is determined by the length t of the authentication tag. When the length of P is zero, GCM acts as a MAC on the input A. The mode of operation that uses GCM as a stand-alone message authentication code is denoted as GMAC.

The equations used by the CGM encryption module 12, shown in FIG. 1, will now be described. The following assumes that the block cipher width, w, is 128 bits.

Let n and u denote a pair of positive integers, such that the total number of bits in the plaintext is $(n-1)128+u$, where $1 \leq u \leq 128$. The plaintext consists of a sequence of n bit strings, in which the bit length of the last bit string is u, and the bit length of the other bit strings is 128. The sequence is denoted $P_1, P_2, \ldots, P_{n-1}, P^*_n$, and the bit strings are called data blocks, although the last bit string, $P^*_n$, may not be a complete block. Similarly, the ciphertext is denoted as $C_1, C_2, \ldots, C_{n-1}, C^*_n$, where the number of bits in the final block $C^*_n$ is u. The additional authenticated data A is denoted as $A_1, A_2, \ldots, A_{m-1}, A^*_m$, where the last bit string $A^*_m$ may be a partial block of length v, and m and v denote the pair of positive integers such that the total number of bits in A is $(m-1)128+v$ and $1 \leq v \leq 128$.

The authenticated encryption operation is defined by the following equations, where w is used as the block cipher width:

$$H = E(K, 0^w)$$

$$Y_0 = IV \| 0^{31} 1 \text{ if } \text{len}(IV) = w - 32$$

$$Y_0 = GHASH(H, \{\}, IV) \text{ otherwise}$$

$$Y_i = \text{incr}(Y_{i-1}) \text{ for } i = 1, \ldots, n$$

$$C_i = P_i \oplus E(K, Y_i) \text{ for } i = 1, \ldots, n-1$$

$$C^*_n = P^*_n \oplus MSB_u(E(K, Y_n))$$

$$T = MSB_t(GHASH(H, A, C) \oplus E(K, Y_0))$$

Successive counter values are generated using the function incr( ), which treats the rightmost 32 bits of its argument as a nonnegative integer with the least significant bit on the right, and increments this value modulo $2^{32}$.

The function len( ) returns a 64-bit string containing the nonnegative integer describing the number of bits in its argument, with the least significant bit on the right. The expression $0^I$ denotes a string of I zero bits, and $A\|B$ denotes the concatenation of two bit strings A and B. The function $MSB_t(S)$ returns the bit string containing only the most significant (leftmost) t bits of S, and the symbol { } denotes the bit string with zero length.

The function GHASH is defined by $GHASH(H, A, C) = X_{m+n+1}$, where the inputs A and C are formatted as described above, and the variables $X_i$ for $i = 0, \ldots, m+n+1$ are defined as follows:

$$X_i = 0 \quad i = 0$$

$$X_i = (X_{i-1} \oplus A_i) \cdot H \quad i = 1, \ldots, m-1$$

$$X_i = (X_{m-1} \oplus (A^*_m \| 0^{w-v})) \cdot H \quad i = m$$

$$X_i = X_{i-1} \oplus C_{i-m} \cdot H \quad i = m+1, \ldots, m+n-1$$

$$X_i = (X_{m+n-1} \oplus (C^*_n \| 0^{w-u})) \cdot H \quad i = m+n$$

$$X_i = (X_{m+n} \oplus (\text{len}(A) \| \text{len}(C))) \cdot H \quad i = m+n+1$$

The authenticated decryption operation is similar to the encrypt operation, but with the order of the hash step and encrypt step reversed. More formally, it is defined by the following equations:

$$H = E(K, 0^w)$$

$$Y_0 = IV \| 0^{31} 1 \text{ if } \text{len}(IV) = w - 32$$

$$Y_0 = GHASH(H, \{\}, IV) \text{ otherwise}$$

$$T' = MSB_t(GHASH(H, A, C) \oplus E(K, Y_0))$$

$$Y_i = \text{incr}(Y_{i-1}) \text{ for } i = 1, \ldots, n$$

$$P_i = C_i \oplus E(K, Y_i) \text{ for } i = 1, \ldots, n-1$$

$$P^*_n = C^*_n \oplus MSB_u(E(K, Y_n))$$

The tag T' that is computed by the decryption operation is compared to the tag T associated with the ciphertext C. If the two tags match (in both length and value), then the ciphertext is returned. Otherwise, the special symbol FAIL is returned.

Figure 3:
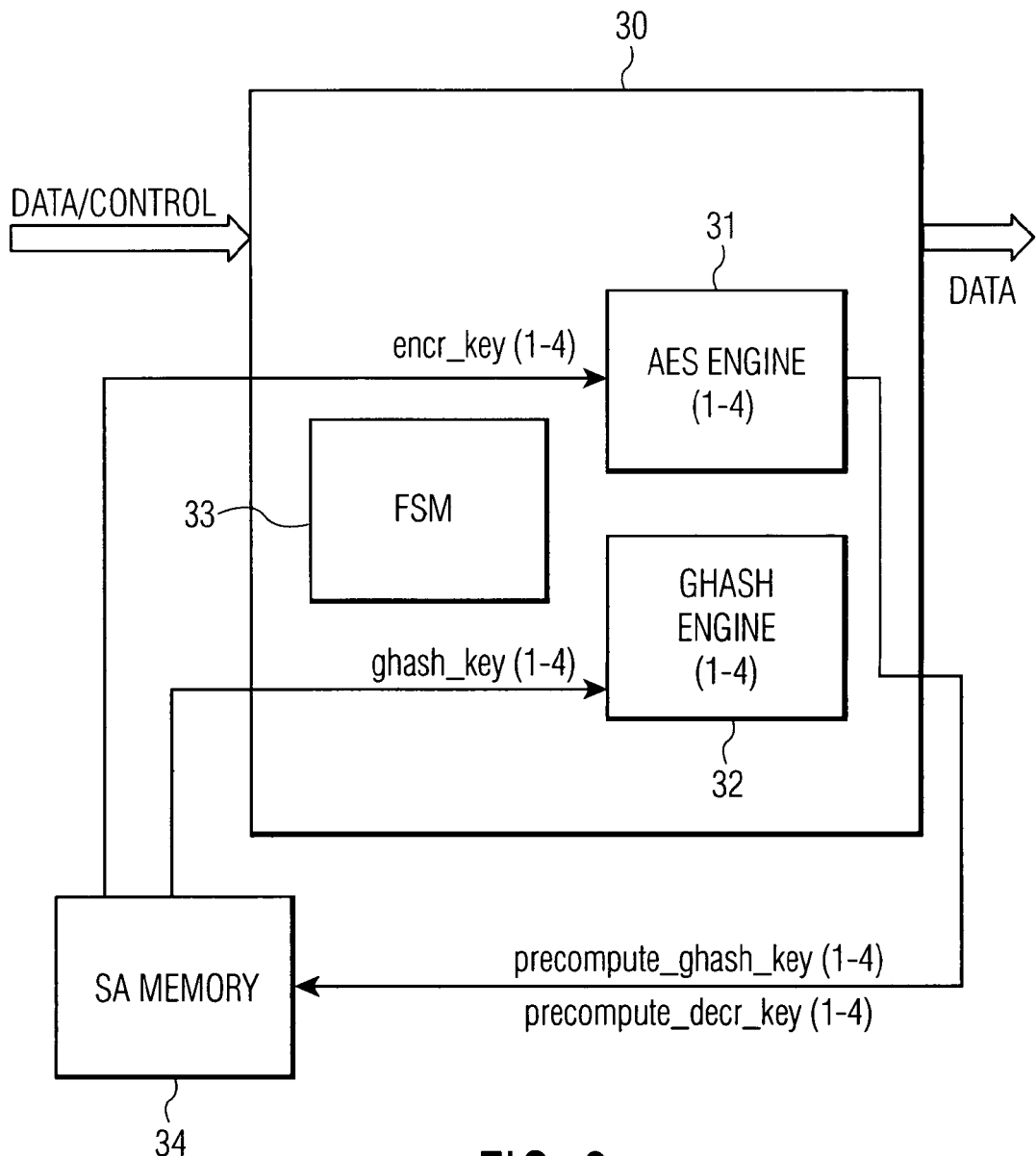
FIG. 3 is a block diagram of an AES-GCM encryption module with an external SA memory, in accordance with an embodiment of the present invention.

Referring next to FIG. 3, there is shown a functional block diagram of an AES-GCM encryption module, generally designated as 30. The SA memory 34, which is external to the AES-GCM encryption module, stores the encryption key K and the hash key H. As described above, $$H = E(K, 0^w)$$

which is the block cipher encryption of the value $0^w$ with the key K.

The encryption key K is provided to AES engine 31 and the hash key H is provided to GHASH engine 32. The finite state machine (FSM), generally designated as 33, receives input control signals and controls AES-GCM encryption module 30. The AES engine 31 may be operated in the electronic codebook (ECB) mode, the cipher block chaining (CBC) mode and the counter (CTR) portion of the GCM for both encryption and decryption. The AES engine supports different key block sizes, including 128 bits, 192 bits and 256 bits.

The AES engine executes an algorithm having operations performed on a two-dimensional array of bytes called the Sate. The State consists of four rows of bytes, each containing Nb bytes, where Nb is the block length divided by 32. The State includes an input and an output. At the start of the cipher and inverse cipher, the input, which is the array of input bytes, is copied into the State array. The cipher or inverse cipher operations are then conducted on this State array, after which its final value is copied to the output, which is another array of output bytes.

For the AES engine algorithm, the length of the input block, the output block and the State is 128 bits. This is represented by Nb=4, which reflects the number of 32-bit words (number of columns) in the State. The length of the cipher key, K, is 128, 192 or 256 bits. The key length is represented by Nk=4, 6 or 8, which reflects the number of 32-bit words (number of columns) in the cipher key. The number of rounds performed during the execution of the algorithm is dependent on the key size. The number of rounds is represented by Nr, where Nr=10 when Nk=4, Nr=12 when Nk=6, and Nr=14 when Nk=8.

For both its cipher and inverse cipher, the AES engine algorithm uses a round function that is composed of four different byte-oriented transformations: (1) byte substitution using a substitution table (S-box), (2) shifting rows of the State array by different offsets, (3) mixing the data within each column of the State array, and (4) adding a round key to the State. These transformations (and their inverses) are described in the AES standard publication referred to above and incorporated herein by reference. These key-block-round combinations are summarized in the following table:

|         | Key Length (Nk words) | Block Size (Nb words) | Number of Rounds (Nr) | Clock Periods |
| ------- | --------------------- | --------------------- | --------------------- | ------------- |
| AES-128 | 4                     | 4                     | 10                    | 10            |
| AES-192 | 6                     | 4                     | 12                    | 12            |
| AES-256 | 8                     | 4                     | 14                    | 14            |

At the start of the cipher, the input is copied to the State array, as described above. After an initial round key addition, the State array is transformed by implementing a round function 10, 12 or 14 times (depending on the key length), with the final round differing slightly from the first Nr−1 rounds. The final State is then copied to the output, as described above.

As described, the cipher includes four transformations. These individual transformations—SubBytes( ), ShiftRows( ), MixColumns ( ), and AddRoundKey ( )—process the State. All Nr rounds are identical with the exception of the final round, which does not include the MixColumns( ) transformation.

It will be appreciated that the aforementioned cipher may be inverted and then implemented in reverse order to produce an inverse cipher for the AES engine algorithm. The individual transformations used in the inverse cipher—InvShiftRows( ), InvSubBytes( ), InvMixColumns( ), and AddRoundKey( )—process the State and are described in the AES standard publication.

The present invention, if the key size is 128 bits, computes the hash key H using AES engine 31 by executing 10 rounds of computations (10 clock periods). After the last round is computed, the hash key H is sent to SA memory 34 for storage. Similarly, the present invention, if the key size is 192 bits, computes the hash key H by executing 12 rounds of computations (12 clock periods), and then storing the hash key H in SA memory 34. Furthermore, the present invention, if the key size is 256 bits, computes the hash key H by executing 14 rounds of computations (14 clock periods). After the last round, the present invention stores the hash key H in the SA memory.

The AES engine is advantageously programmed to calculate and store the hash key H prior to the time of key exchange between the sender and the receiver. Such pre-calculation saves 10, 12 or 14 clock cycles per packet or frame that would otherwise be required to calculate the hash key H every packet or frame.

Figure 4:
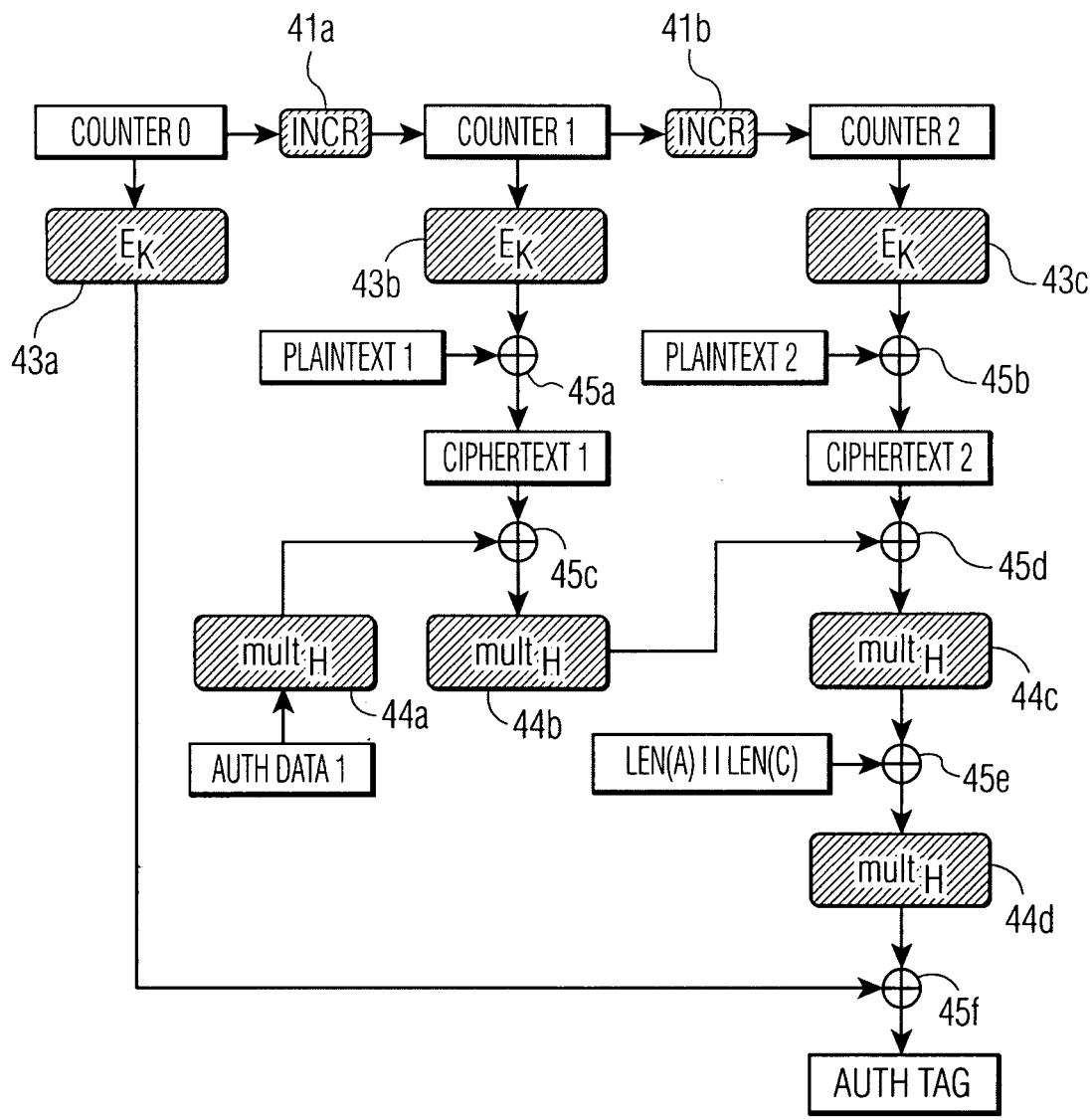
FIG. 4 is a functional block diagram of an authenticated encryption operation showing block cipher encryption and multiplication over a Galois field.

Referring next to FIG. 4 and recalling the authenticated encryption equations, the manner in which the authentication tag is determined is exemplified by the authenticated encryption operation, generally designated as 40. The authentication operation 40 includes two main functions used in GCM which are the block cipher encryption and the multiplication over the field GF ($2^{128}$). As shown, the $E_K$ function (designated as 43a, 43b and 43c) denotes the block cipher encryption using the key K. The $mult_H$ function (designated as 44a, 44b, 44c and 44d) denotes multiplication in GF ($2^{128}$) by the hash key H. The incr function (designated as 41a and 41b) denotes the counter (CTR) increment function. For simplicity, only a single block of additional authenticated data (designated Auth Data 1) and two blocks of plaintext (designated Plaintext 1 and Plaintext 2) are shown.

The addition of two elements X and Y in GF ($2^{128}$) consists of adding a polynomial representing X with another polynomial representing Y. This operation is identical to the bitwise exclusive-or (XOR) of X and Y. The XOR operations are shown in FIG. 4 as XOR 45a through XOR 45f. The multiplication of two elements X and Y consists of multiplying a polynomial representing X with polynomial representing Y, then dividing the resulting 256-bit polynomial by a field polynomial; a 128-bit remainder is the result. The field polynomial is fixed and determines the representation of the field. The GCM uses the polynomial $f=1+\alpha+\alpha^2+\alpha^7+\alpha^{128}$.

In general, referring to FIG. 4, CTR 41a, b provides the Yi counter output, which is encrypted with the encryption key K in $E_K$ module 43b, c. The encrypted output is XOR-ed with plaintext 1, 2, thereby obtaining ciphertext 1, 2. Separately, the CTR state Yo (counter 0) is encrypted by $E_K$ module 43a to obtain E(K,Yo). The Auth Data 1 is operated on by $mult_H$ (44a) and then XOR-ed with ciphertext 1, which is then operated on by $mult_H$ (44b). The output of $mult_H$ (44b) is XOR-ed with ciphertext 2, which is then operated on by $mult_H$ (44c). The output of $mult_H$ (44c) is XOR-ed with the concatenation of bit strings A and C, which is finally XOR-ed with E(K,Yo) to obtain the authentication tag T, described previously. It will be appreciated that the previously described variable Xi results from the iterative operations of multiplying the hash key H with the ciphertext or the AAD. In turn, the GHASH function is defined by GHASH (H, A, C)=Xi.

Figure 5:
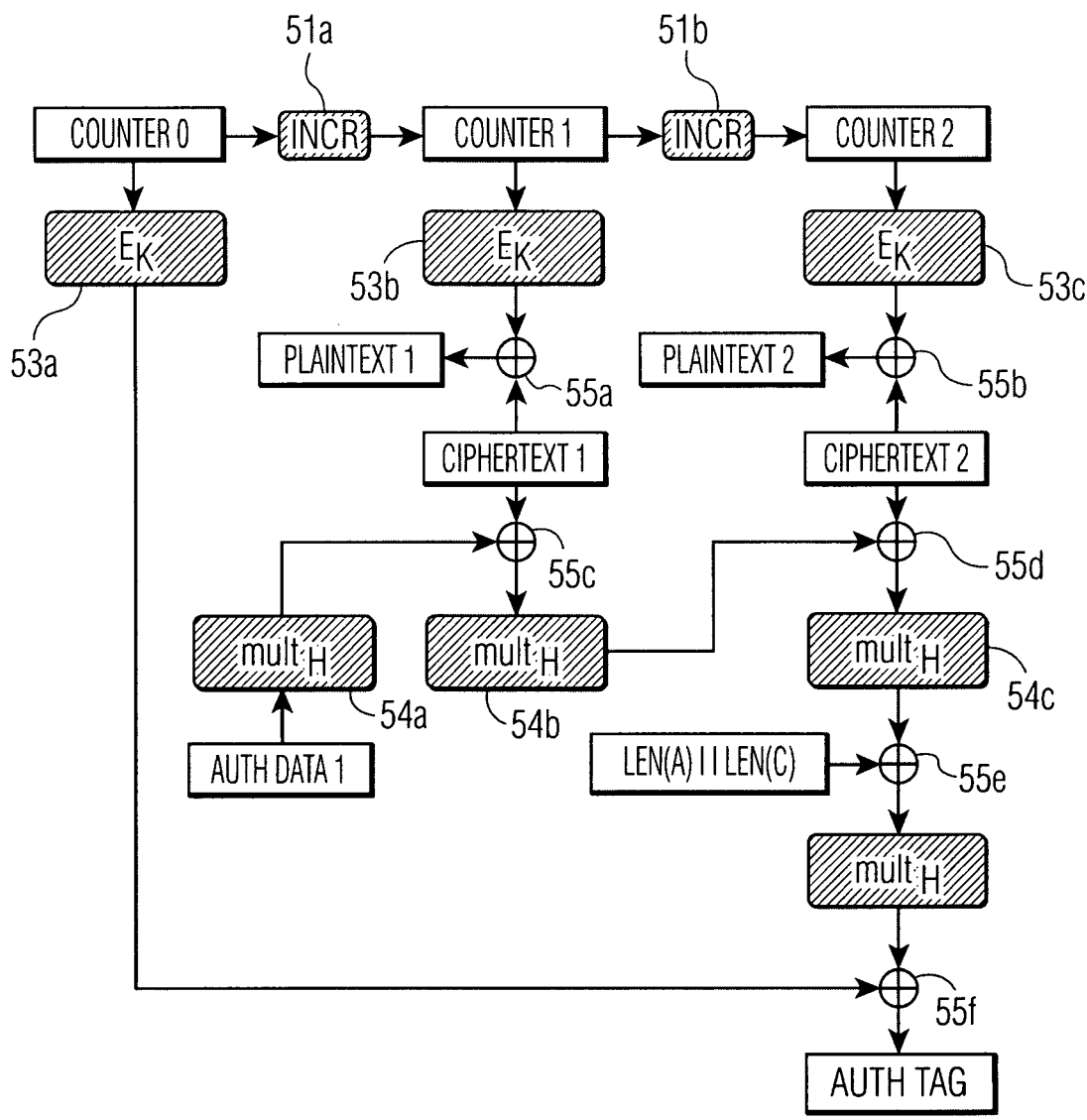
FIG. 5 is a functional block diagram of an authenticated decryption operation, showing block cipher decryption and multiplication over the Galois field.

Referring next to FIG. 5 and recalling the previously described authenticated decryption equations, the manner in which the authentication tag is obtained during the decryption operation is shown as method 50. The method 50 is similar to method 40, except that the ciphertext, when XOR-ed with the output of the $E_K$ module, produces the plaintext. As shown, the $E_K$ module (designated as 53a, 53b and 53c) produces the block cipher decryption using the key K. The $mult_H$ function (designated as 54a, 54b, 54c and 54d) denotes multiplication in GF ($2^{128}$) by the hash key H. The incr function (designated as 51a and 51b) denotes the counter (CTR) increment function. For simplicity, only a single block of additional authenticated data (designated Auth Data 1) and two blocks of ciphertext (designated ciphertext 1 and ciphertext 2) are shown.

Figure 6:
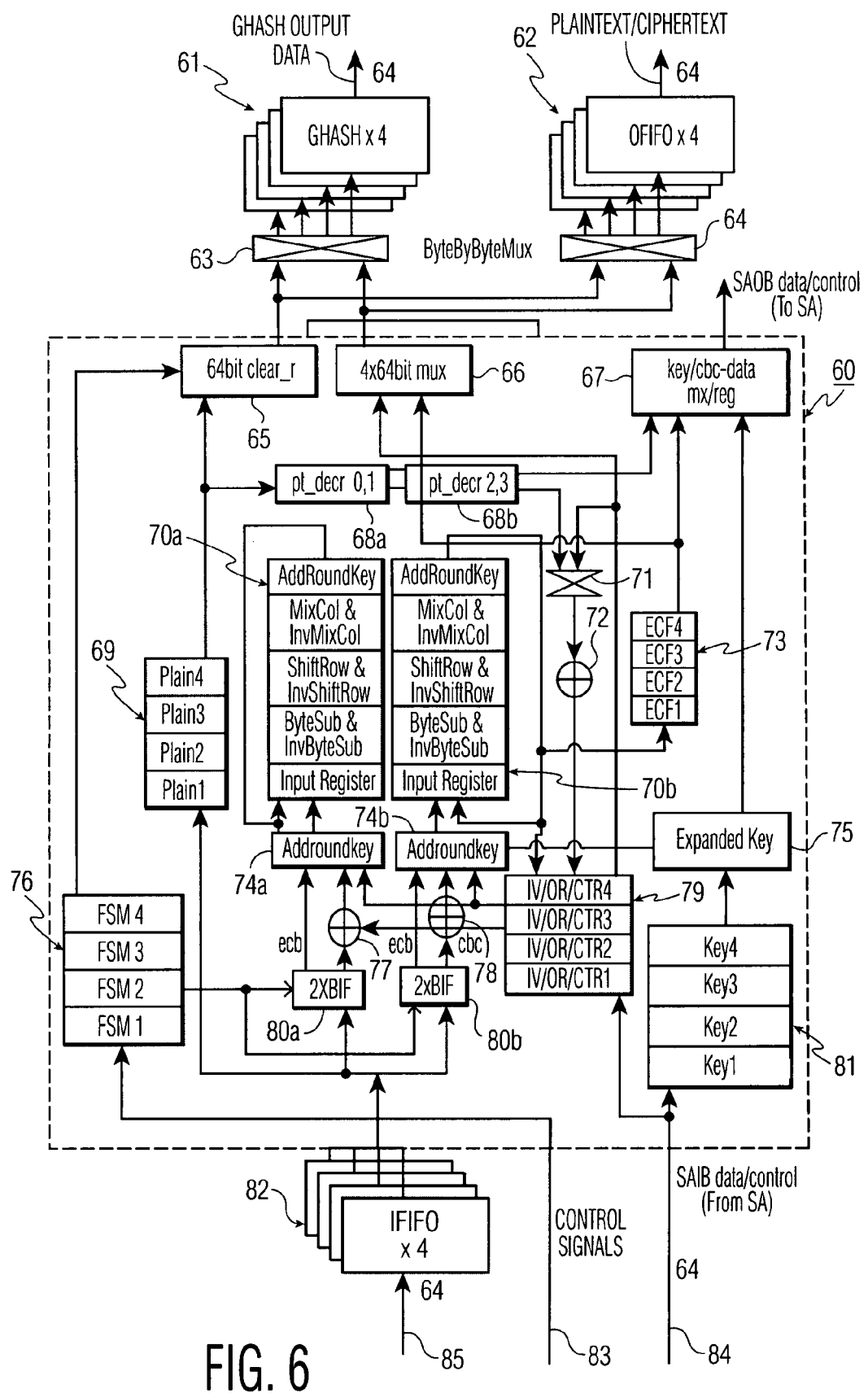
FIG. 6 is a block diagram of an AES engine module that includes four channels of input data flow and two cipher transformation modules, in accordance with an embodiment of the present invention.

An exemplary block diagram of an AES engine module is shown in FIG. 6, generally designated as 60. The AES engine module includes four channels of data flow, which share two cipher transformation modules. The two cipher transformation modules are shown designated as 70a and 70b. It will be understood that up to four cipher transformations modules may be included, so that each of the four channels has its own cipher transformation module. Four input registers 82 are depicted in the figure. The input registers 82 are first-in-first-out (FIFO) registers, though other types of registers may be used. The input registers each receives a data string of a first predetermined bit length from its corresponding system channel. In the exemplary embodiment, the predetermined bit length (designated 85) is 64 bits, though larger data strings may be used.

The control signals 83, key 84 (one key data per channel) and the state array input buffer (SAIB) control (also 84) are provided as input signals to AES engine module 60. The control signals are coupled, one each, to four finite state machine controllers (FSMs) 76. There is one FSM 76 associated with each channel, each of which, in response to the received control signals, controls the operation of AES engine module 60.

The input registers 82 are coupled to buffer register 80a, 80b. Each buffer register, under control of one of the FSMs, selectively retrieves and stores data strings of a predetermined bit length from one of FIFO registers 82, until a data block of a predetermined bit length is stored in buffer input FIFO register 80a, 80b (BIF register 80a, 80b). The predetermined bit length of the data block is a block length supported by the AES block cipher, namely 128-bit length.

The AES engine module 60 includes a cipher key storage register 81 for each system channel. The cipher key storage register 81 receives from the SA the cipher key K associated with each system channel (four channels). Under control of its respective FSM, the cipher key storage register transmits the stored cipher key K to a key expansion block 75. The key expansion block 75 generates a single round key by performing a single key expansion operation for each round of the AES block cipher.

The output data of buffer register 80a, 80b is coupled to XOR circuit 77, 78 to perform the logical XOR operation. Each XOR circuit receives the data block from each of buffer registers 80a, 80b and another data block from each of four IV/OR/CTR registers 79. These two blocks of data are XOR-ed. There is one IV/OR/CTR register for each system channel. These registers store the IV (nonce) for calculating Yo during the counter O-state of the AES-GCM mode, and/or calculating Yi during the other counter (CTR) states of the AES-GCM mode. Two other modes are also shown, namely the ECB mode and the CBC mode. Responsive to an ECB/CBC control signal, data stored in IV/OR/CTR registers 79 is transmitted to XOR circuit 77, 78, or a string of zeros is transmitted to XOR circuit 77, 78. In the CBC mode, the IV is XOR-ed with the data in BIF 80a, 80b before being sent to encryption modules 70a, 70b. In the ECB mode, no IV is used. In the CTR/GCM mode, counter 1, 2, 3, 4 is used to input data into encryption modules 70a, 70b for encryption operation. The OR in IV/OR/CTR 1-4 (designated as 79) is an output register, which stores the encrypted data provided from encryption modules 70a, 70b.

Prior to each round of the AES block cipher, key expansion block 75 transmits the round key to one of AddRoundKey functional blocks 74a, 74b. There may be up to four AddRoundKey functional blocks (one for each channel). The data block from one of buffer register 80a, 80b which was XOR-ed with the data block is from register 79, is transferred to AddRoundKey functional block 74a, 74b. The AddRoundKey function block 74a, 74b receives a data block and performs an initial AddRoundKey transformation on the data block in accordance with the AES block cipher. The data block from the AddRoundKey functional block 74a, 74b is then transmitted to an input register of cipher transformation module 70a, 70b (one per channel).

The data block transmitted to the cipher block input register of transformation blocks 70a, 70b is then operated on by the AES block cipher transformations, for either encryption or decryption. Specifically, if the received control signals instruct the FSM for the particular channel to encrypt data, then the encryption transformations are operative. Conversely, if the received control signals instruct the FSM for the particular channel to decrypt data, then the decryption transformations are operative. The transformation functions share combined logic circuitry for carrying out the encryption or decryption transformations. Thus, a first transformation performs either the ByteSub or InvByteSub transformation on the received data block. Likewise, the second and third transformations perform either the ShiftRow or InvShiftRow and MixCol or InvMixCol, respectively, based on the signal received from the particular channel FSM. The data block is successively operated upon by these transformations and then transmitted to a second AddRoundKey block of transformation block 70a, 70b.

After this initial transformation round, the data block is fed back to the cipher block input register for the next transformation round. In addition, depending on the state, the data block is transmitted to encrypted counter FIFO (ECF) 73 (one per channel) and/or IV/OR/CTR 79 (one per channel).

If the data block is being decrypted, then the data block is fed back to is the cipher block input register of transformation module 70a, 70b, by way of (1) plaintext decryption registers 68a, 68b (one per channel) (2) multiplexer 71 and (3) XOR circuit 72. The plaintext decryption registers 68a, 68b receive data from plaintext registers 69 (one per channel).

After the predetermined number of transformation rounds is completed, the last round key in key expansion block 75 is stored in a memory external to AES-GCM engine module 60. This last round key is then available for use as the initial round key value during a subsequent decryption operation. The round key value is transmitted to the SA memory (FIG. 3) by way of key/cbc-data multiplex register 67 included in the SA output buffer (SAOB) data/control.

The data strings transferred to buffer register 80a, 80b from one of the channel-input registers 82 are also transferred to the appropriate plaintext storage register 69. The data strings are stored in the plaintext storage register until the other data strings have been encrypted (or decrypted) a predetermined number of rounds by the encryption/decryption circuitry. The so-called "plaintext" data in plaintext storage register 69 is then transmitted to 64-bit register 65.

The output data strings of Ci (ciphertext) are provided from IV/OR/CTR register 79 (one per channel) as output data by way of the 4×64 bit mux 66. The output data strings of Ci are used as input data to calculate the GHASH (H, A, C) in GHASH modules 61 (or GHASH engine 32, shown in FIG. 3).

The output of 4×64 bit mux 66 and the output of register 65 are coupled to the 4 GHASH modules 61 (one per channel) by way of multiplexer 63. The outputs of 4×64 bit mux 66 and register 65 are also coupled to 4 FIFO registers 62 (one per channel) by way of multiplexer 64. The multiplexer 63 provides the Ci data strings or the AAD (plaintext) to GHASH modules 61 to perform the Galois multiplication (see FIG. 4). The multiplexer 64 provides the plaintext/ciphertext as an output by way of FIFO registers 62. The HASH key is provided as an output by way of key/cbc-data mux/register 67 to the SA memory for storage.

Figure 7:
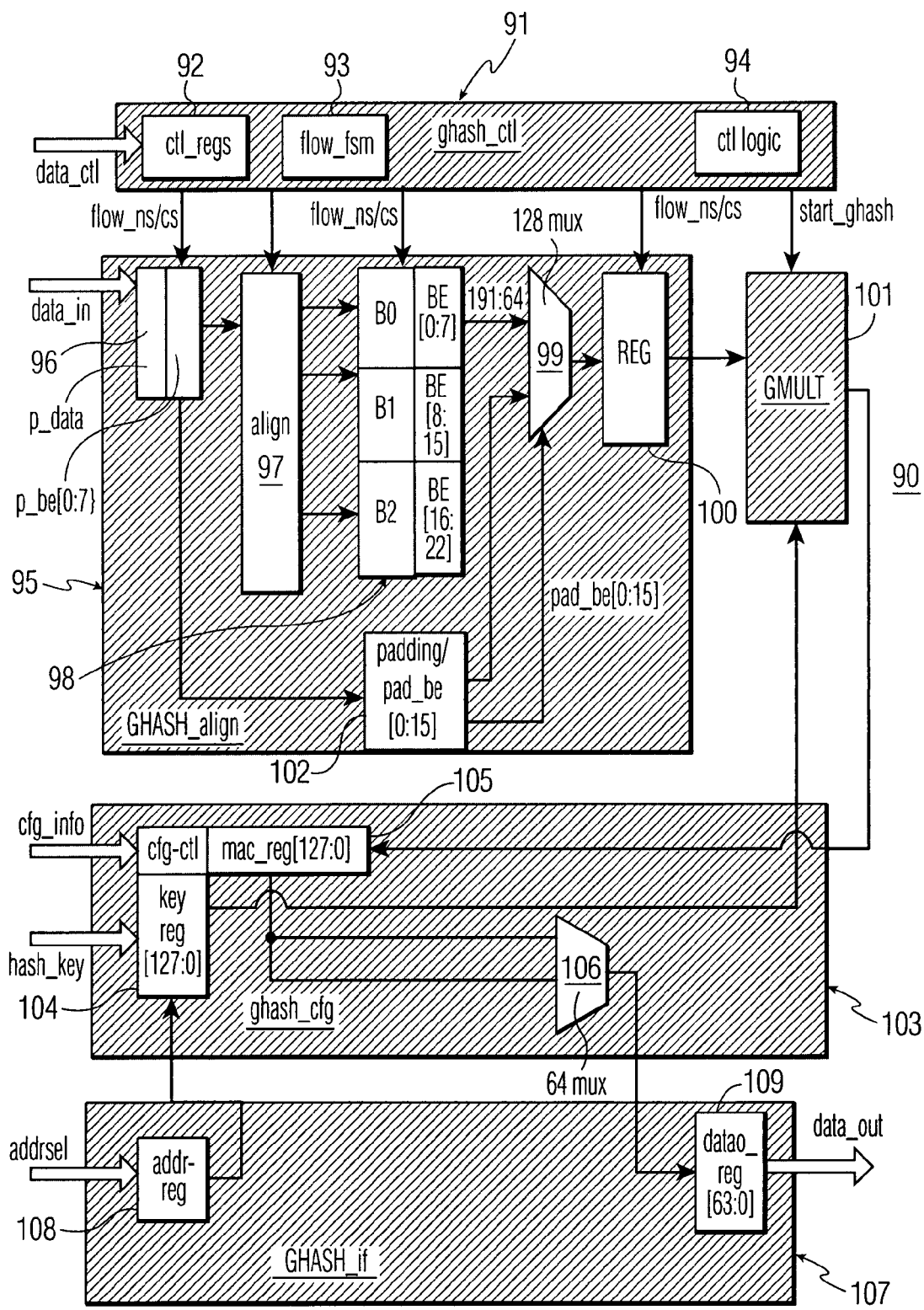
FIG. 7 is a block diagram of a GHASH engine, in accordance with an embodiment of the present invention.

Referring next to FIG. 7, there is shown an exemplary GHASH engine, generally designated as 90. There may be up to 4 such GHASH engines. The GHASH engine 90 includes ghash controller 91, GHASH alignment module 95, GMULT module 101, ghash configuration module 103 and GHASH interface module 107. The ghash controller 91 receives control data for storage in control registers 92. The sequence of the state machine is tracked in flow fsm module 93, while the control of GMULT module 101 is provided by control logic module 94.

The GHASH alignment module 95 receives data blocks of ciphertext (Ci), which is computed in AES engine 31 (FIG. 3). At the same input data bus, GHASH alignment module 95 also receives the AAD bits ($A_i$). The data blocks are sent to alignment module 97 by way of pipeline 96, and are byte-enabled in register 98. After byte alignment, a 128 bits are provided to register 100. When necessary, multiplexer 99 pads some of the bits with zero bits, which are received from padding module 102.

The ciphertext and/or the AAD bits are provided to GMULT module 101 for performing multiplication of the ciphertext and/or the AAD with the hash key. There may be up to four hash keys stored in the SA memory (one per channel). The controller logic module 94 starts to GHASH multiplication. As shown, the hash key (one, up to four hash keys) is provided to the GMULT module by way of key register 104. It will be understood that the hash key has already been computed by AES engine 31 (FIG. 3) and stored in SA memory 34. Accordingly, when the ciphertext data is received by GHASH alignment module 95, the hash key is ready for use by GMULT module 101 by way of key register 104.

Result of the hash multiplication is outputted to MAC register 105. Thus, the GHASH (H, A, C), which is defined by $X_i$, is outputted by way of multiplexer 106 and data output register 109, under control of address register 108. The final computation of the authentication tag T is performed elsewhere upon XOR-ing of the GHASH (H, A, C) with the E(K,Yo) (see FIG. 4).

Figure 8:
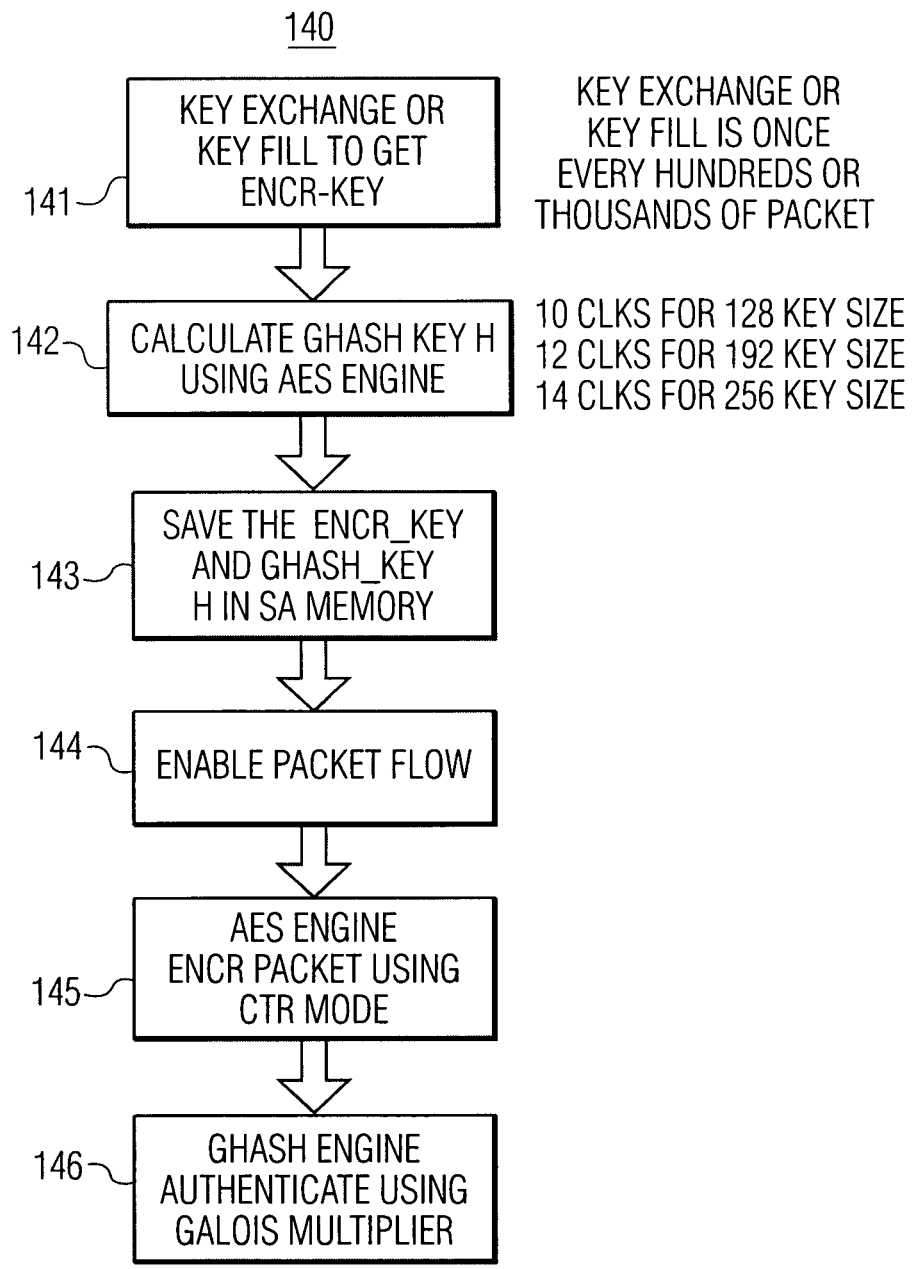
FIG. 8 is a flow diagram depicting a method for authenticating a packet of data, in accordance with an embodiment of the present invention.

Referring next to FIG. 8, there is shown a method for authenticating a packet of data in accordance with an exemplary embodiment of the present invention. As shown, step 141 provides a key exchange between the sender and the receiver. In this manner, the encryption key (cipher key) K is obtained. Such key exchange may be performed, for example, once every 100 packets, or once every 1000 packets. Step 142 then calculates the GHASH key H using AES engine 31 (FIG. 3). The hash key H is calculated by performing key expansions using ten rounds of expansions on the cipher key K (10 clock cycles) for a 128 bit cipher key, or 12 rounds (12 clock cycles) for a 192 bit cipher key, or 14 rounds (14 clock cycles) for a 256 bit cipher key. Step 143 saves the received cipher key K and the computed hash key H in SA Memory 34 (FIG. 3).

After the cipher key K and the hash key H are saved in the SA memory, step 144 uses a logic controller to enable the packet flow input into AES engine 31. Step 145 performs the encryption using the AES-CTR mode of operation. Finally, step 146 authenticates the packet by way of GHASH engine 32 (FIG. 3) using the Galois multiplier.

Figure 9:
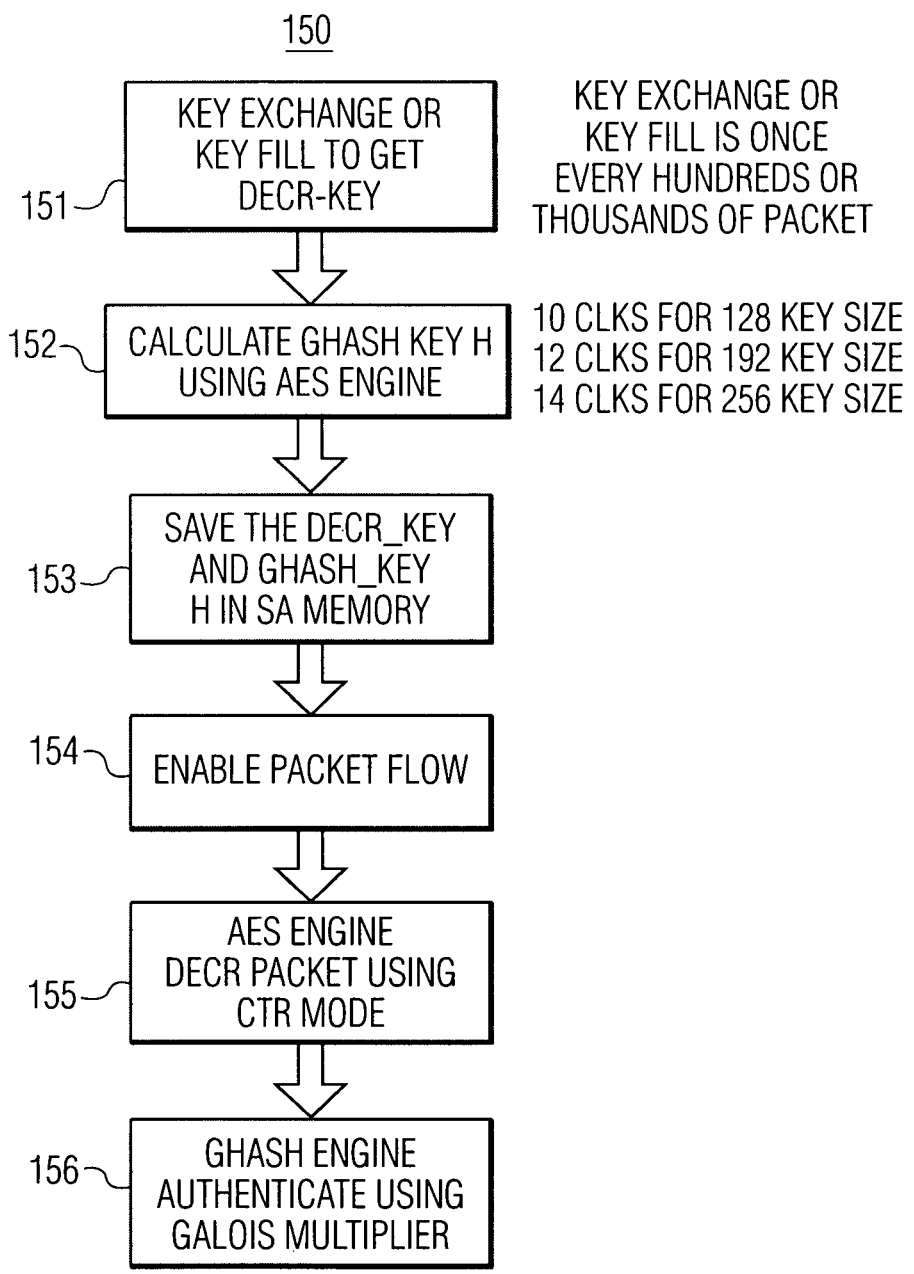
FIG. 9 is a flow diagram of a method for authenticating an encrypted packet of data, in accordance with an exemplary embodiment of the present invention.

In a similar manner, FIG. 9 shows a method for authenticating an encrypted packet of data at the receiver's end, in accordance with an exemplary embodiment of the present invention. As shown, step 151 provides a key exchange between the sender and the receiver. In this manner, the decryption key (decipher key) K is obtained. Such key exchange may be performed, for example, once every 100 packets, or once every 1000 packets. Step 152 then calculates the GHASH key H using AES engine 31 (FIG. 3). The hash key H is calculated by performing key expansions using ten rounds of expansions on the decipher key K (10 clock cycles) for a 128 bit decipher key, or 12 rounds (12 clock cycles) for a 192 bit decipher key, or 14 rounds (14 clock cycles) for a 256 bit decipher key. Step 153 saves the received decipher key K and the computed hash key H in SA Memory 34 (FIG. 3).

After the decipher key K and the hash key H are saved in the SA memory, step 154 uses a logic controller to enable the encrypted packet flow input into AES engine 31. Step 155 performs the decryption using the AES-CTR mode of operation. Finally, step 156 authenticates the packet by way of GHASH engine 32 (FIG. 3) using the Galois multiplier.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An authenticated encryption method comprising the steps of:
    (a) receiving, by an Advanced Encryption Standard (AES) engine, a cipher key;
    (b) computing, by the AES engine, a hash key using the received cipher key prior to receiving a packet of data;
    (c) storing the computed hash key in a storage memory prior to receiving the packet of data;
    (d) receiving, by the AES engine, the packet of data;
    (e) encrypting, by the AES engine, the packet of data using the received cipher key;
    (f) receiving the hash key, by a GHASH engine, from the storage memory;
    (g) authenticating the packet of data, by the GHASH engine, using the hash key;
    (h) receiving one or more other packets of data; and
    (i) authenticating the one or more other packets of data, by the GHASH engine, using the stored hash key.

2. The method of claim 1 wherein
the encrypting step includes using a counter mode in the AES engine to encrypt the packet of data.

3. The method of claim 2 wherein
using the counter mode includes iteratively XOR-ing (a) a plaintext portion of the packet of data with (b) an encrypted value of counter data using the cipher key, and thereby obtaining a ciphertext of data.

4. The method of claim 1 wherein
the authenticating step includes
transmitting the ciphertext to the GHASH engine, and
iteratively multiplying the ciphertext, by the GHASH engine, using the hash key.

5. The method of claim 1 wherein
encrypting the packet of data is performed after the hash key is stored in the storage memory.

6. The method of claim 1 further including the step of:
enabling flow of the packet of data, after the hash key is stored in the storage memory.

7. The method of claim 6 wherein
after enabling the flow of the packet of data, encrypting the packet of data using the encryption key, by the AES engine, and
after enabling the flow of the packet of data, authenticating the packet of data, using the hash key stored in the storage memory, by the GHASH engine.

8. The method of claim 1 wherein
computing the hash key includes performing 10 rounds of key expansion on the received cipher key, if the received cipher key is a 128 bit block of data, and
computing the hash key includes performing 12 rounds of key expansion on the received cipher key, if the received cipher key is a 192 bit block of data, and
computing the hash key includes performing 14 rounds of key expansion on the received cipher key, if the received cipher key is a 256 bit block of data.

9. The method of claim 1 wherein
receiving the cipher key includes receiving at least two separate cipher keys from respective data channels, and
computing the hash key includes computing at least two separate hash keys corresponding to the at least two separately received cipher keys.

10. The method of claim 1 wherein
receiving the packet of data includes receiving during an interval of time a predetermined number of packets of data,
calculating the hash key includes calculating the hash key once per the interval of time, and
storing the computed hash key includes storing the computed hash key once per the interval of time.

11. An authenticated decryption method comprising the steps of:
(a) receiving, by an Advanced Encryption Standard (AES) engine, a cipher key;
(b) computing, by the AES engine, a hash key using the received cipher key prior to receiving a packet of data;
(c) storing the computed hash key in a storage memory prior to receiving the packet of data;
(d) receiving, by the AES engine, the packet of data;
(e) decrypting, by the AES engine, the packet of data using the received cipher key;
(f) receiving the hash key, by a GHASH engine, from the storage memory;
(g) authenticating the packet of data, by the GHASH engine, using the hash key;
(h) receiving one or more other packets of data; and
(i) authenticating the one or more other packets of data, by the GHASH engine, using the stored hash key.

12. The method of claim 11 wherein
the decrypting step includes using a counter mode in the AES engine to decrypt the packet of data.

13. The method of claim 11 wherein
decrypting the packet of data is performed after the hash key is stored in the storage memory.

14. The method of claim 11 further including the step of:
enabling flow of the packet of data, after the hash key is stored in the storage memory.

15. The method of claim 14 wherein
after enabling the flow of the packet of data, decrypting the packet of data using the encryption key, by the AES engine, and
after enabling the flow of the packet of data, authenticating the packet of data, using the hash key stored in the storage memory, by the GHASH engine.

16. An authenticated encryption module comprising:
an Advanced Encryption Standard (AES) engine for using a cipher key to compute a hash key prior to receiving a packet of data,
a storage memory configured to store the computed hash key, and
a GHASH engine configured to receive the computed hash key stored in the storage memory for authenticating the packet of data and one or more other subsequent packets of data,
wherein (a) the AES engine encrypts the packet of data to form ciphertext, (b) the GHASH engine receives the ciphertext from the AES engine to multiply the received ciphertext with the computed hash key, and (c) an authentication tag is computed using the multiplied ciphertext with the computed hash key.

17. The module of claim 16 including
a controller for enabling input flow of the packet of data, after the computed hash key is stored in the storage memory.

18. The module of claim 16 wherein
the packet of data includes additional authenticated data (AAD), and
the GHASH engine is configured to receive the AAD to multiply the AAD with the computed hash key.

19. The module of claim 16 wherein
the AES engine is configured to receive at least two different encryption keys from respective data channels, and
the AES engine includes two encryption modules for encrypting at least two different packets of data received from the respective data channels using the at least two different encryption keys.

20. The module of claim 16 wherein
the hash key is computed by the AES engine once for multiple packets of data received, and
the hash key is stored in the storage memory once for all the received multiple packets of data.

* * * * *